United States Patent [19]

Mankins

[11] Patent Number: 5,139,236
[45] Date of Patent: Aug. 18, 1992

[54] MELT FACILITY FOR CONTINUOUS UPCASTER

[75] Inventor: William L. Mankins, Huntington, W. Va.

[73] Assignee: Inco Alloys International, Inc., Huntington, W. Va.

[21] Appl. No.: 684,015

[22] Filed: Apr. 11, 1991

[51] Int. Cl.$^5$ .............................................. C22B 9/21
[52] U.S. Cl. ........................................ 266/78; 266/94; 266/160; 266/242; 266/900; 164/439; 373/7; 219/421
[58] Field of Search ............... 164/484, 492, 493, 495, 164/416, 439; 373/142, 21, 7; 266/160, 200, 900, 901, 78, 94, 242; 219/421

[56] References Cited

U.S. PATENT DOCUMENTS

| | | | |
|---|---|---|---|
| 3,650,315 | 3/1972 | Abarotin et al. | 164/274 |
| 4,211,270 | 7/1980 | Shinopulos et al. | 164/83 |
| 4,301,857 | 11/1981 | Rushforth | 164/416 |
| 4,307,770 | 12/1981 | Shinopulos et al. | 164/416 |
| 4,581,062 | 4/1986 | Boutin | 75/679 |
| 4,662,431 | 5/1987 | Lowry et al. | 164/503 |

Primary Examiner—Melvyn J. Andrews
Attorney, Agent, or Firm—Edward A. Steen; Bruce S. Londa

[57] ABSTRACT

A furnace system particularly adapted for use with a continuous upcaster. Instead of employing discrete furnaces, tundishes, ladles and the like, the instant unitary system employs a furnace, a feeding mechanism for directly introducing material into the furnace and a plasma torch to melt the material. The rate of material entering the furnace is balanced by the quantity of product emerging from the upcaster.

11 Claims, 2 Drawing Sheets

MELT FACILITY FOR CONTINUOUS UPCASTER

TECHNICAL FIELD

The instant invention relates to continuous casting techniques in general and, more particularly, to a system for maintaining a caster with a steady state stream of molten metal.

BACKGROUND ART

Upcasting is a well known technique wherein a cooled mold, disposed within a molten body of metal, is vertically oscillated to form a continuous cast product. Examples of upcasting may be found in U.S. Pat. Nos. 4,301,857; 4,307,770 and 4,211,270.

Most commercial applications employing upcasting methodology utilize copper or copper-base alloys (brasses, bronzes). Since these materials are relatively easy to melt and usually have straightforward chemical compositions they lend themselves to expeditious large scale continuous melting and forming operations.

Generally speaking the metal is melted in at least one separate furnace that may also serve as a holding facility. The molten metal is then transferred by a ladle or a tundish system to the casting furnace. The caster is partially submerged into the melt and oscillated to generate the desired product.

A concern in any continuous casting operation is the ability to maintain the specification chemistry from the beginning of the cast to the end. Casting times may be long and external heating of the ladle is needed to maintain the necessary temperatures. It has been found that minor elements, particularly reactive elements, can fade over time and the bath may become oxidizing thereby producing a gassy product.

Since the demand for copper containing products is great, these problems can be overcome. Large quantities of copper are continuously melted and fed to the casters.

In contrast, the commercial quantities of nickel and nickel-base alloy materials fashioned into continuous cast rod and the like are small by comparison. Accordingly, a continuous caster for working them must be in reality a semi-continuous or batch operation. Moreover, the caster must be amenable to quick changes in alloy chemistry and size requirements while maintaining strict compositional limits and complete deoxidation throughout the melting and casting operations. Oftentimes, the chemistry of nickel-base alloy systems is more critical than copper-base alloys. This requires greater vigilance during processing.

In essence, in order to employ an upcaster efficiently with respect to nickel and nickel-base alloys, the technique requires:

1) the capacity to provide molten metal to the upcaster on a continuous or semi-continuous (batch) basis;
2) the ability to quickly handle substantial alloy changes; and
3) the availability of a "clean" furnace for each different alloy or alloy family.

SUMMARY OF THE INVENTION

This invention relates to a furnace system for directly supplying, at a controlled rate, a constant stream of molten metal to an upcaster without the need for separate furnaces, ladles, and tundishes.

PREFERRED EMBODIMENT OF THE INVENTION

Figure 1:
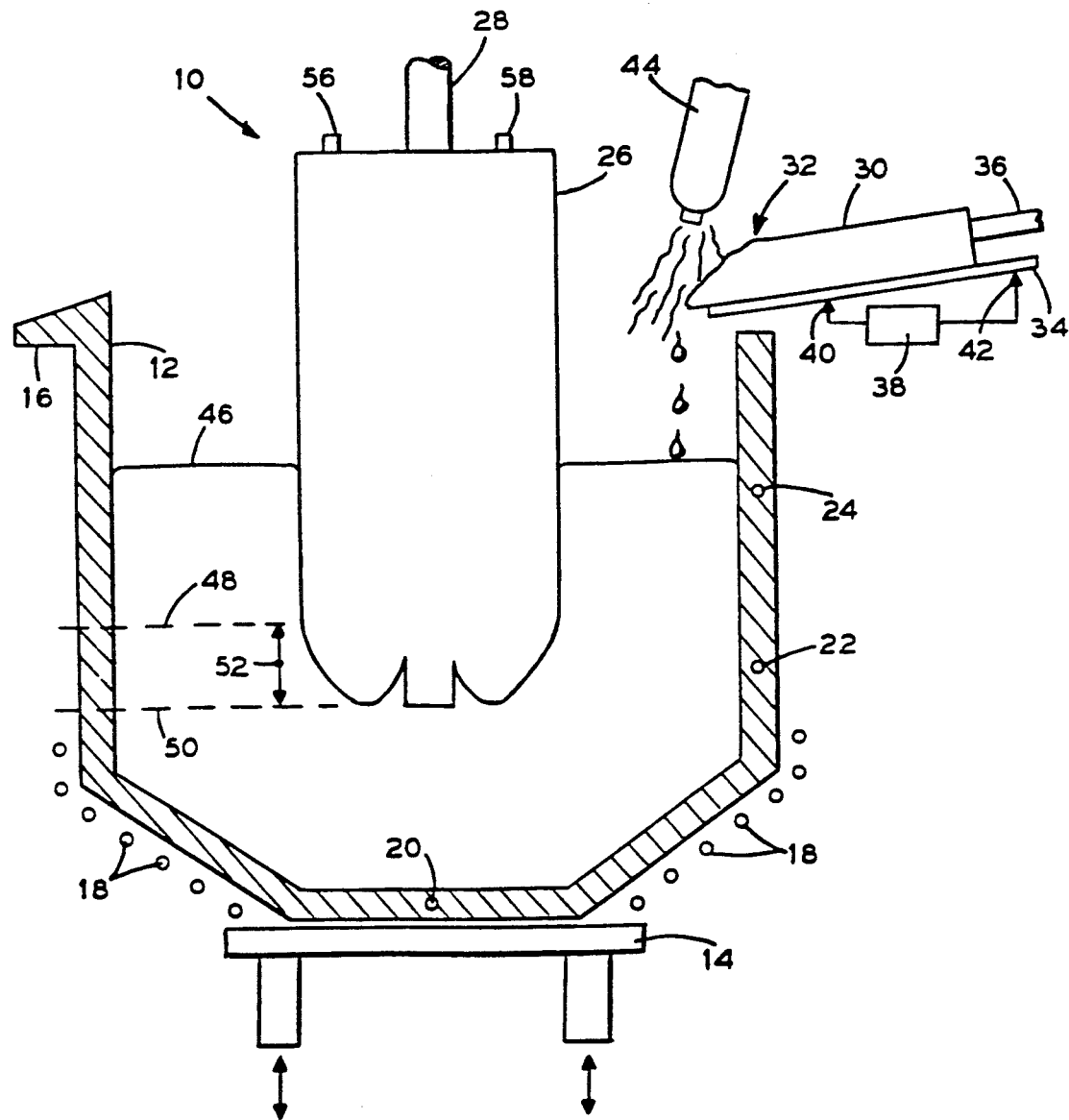
FIG. 1 is an elevation, in cross-section, of an embodiment of the invention.

Referring to FIG. 1, there is shown a furnace system 10.

The system 10 includes an open top furnace 12 supported on an elevator 14. One wall of the furnace 12 includes a pouring lip 16.

The furnace 12 is preferably an induction furnace heated by high frequency induction coils 18. A plurality of temperature sensors 20, 22 and 24, preferably thermocouples, measure the temperature at different locations about the furnace 12.

An upcaster 26 is movably disposed within the furnace 12. The cast product 28 emerges and is drawn from the top of the upcaster 26. Although an upcaster 26 is integral to the instant invention, it is also distinct from it. Any suitable caster may be utilized. A non-limiting example is the caster disclosed in U.S. Pat. No. 4,331,857. On the other hand, the furnace system 10 may be adapted to be used with any casting apparatus that could benefit from the instant design.

The melt stock 30 is melted and introduced into the furnace by a feeding mechanism 32. In the embodiment shown, the feeding mechanism 32 includes an inclinable ramp 34, a push rod 36, and a melting rate detector 38, preferably scales or load cells 40 and 42. A plasma torch 44 melts the stock 30 at a controlled rate.

The level of the molten metal 46 is maintained at an appropriate height for the upcaster 26 to operate effectively. An object of the invention is that the melting rate of the melt stock 30 being fed into the furnace 12 equals the output casting rate of the upcaster 26. That is, there is an equilibrium feeding rate established between the introduction of molten metal and the draw of the upcaster 26.

Dashed lines 48 and 50 denote the top and bottom stroke excursions of the upcaster 26 respectively. In other words, arrow 52 represents the oscillation distance of the upcaster 26.

The system 10 operates as follows. Initially when the upcaster 26 is first set up, the furnace 12 may be in a lowered position, or be removed from beneath the upcaster 26. The upcaster 26 is generally in a fixed position but vertically oscillates during actual operation. Heat must be provided to the upcaster 26 prior to immersing it into the molten metal bath 46. The upcaster 26 has a ceramic shroud to cover the internal water cooled copper mechanism. A thermal shock to the ceramic shroud could crack it presenting the possibility of an explosion if water leaked into the molten metal bath upon immersion. Heating of the shroud can be accomplished with a resistance heated blanket or a gas torch. The plasma torch 44 could be rotated to be directed upon it.

Temperature sensors 56 and 58, preferably thermocouples, measure the temperature of the incoming and outgoing water coolant of the upcaster 26.

The initial or starter charge is placed in the furnace 12 and melted using the high frequency induction heating coils 18 that surround the furnace 12. Note that the coils 18 are located below the lower tip of the upcaster 26 when it is immersed in the furnace 12 and at its lowest position of the oscillatory stroke 50. If the coils 18 are high enough to place the upcaster 26 within the induced field, there is a danger of overheating and damaging the upcaster 26.

The internal diameter of the furnace 12 must be wide enough to accommodate the upcaster 26; have freespace between the upcaster 26 and the furnace wall to allow molten metal from the feeding mechanism 32 to enter the bath; and be large enough to prevent chilling of the bath between the upcaster 26 and the furnace wall.

It may be necessary to provide a slag covering or insulator on the exposed top surface of the melt 46 during operation (i.e., low melting slag or vermiculite).

The placement of the heating coils about the lower portion of the furnace 12 not only protects the upcaster 26 and maintains the molten charge but, in addition, (1) continuously stirs the molten bath by virtue of induction; and (2) provides a relatively precise means for controlling the temperature within the bath by selectively varying the power input. Temperature control is critical when melting nickel-base alloys.

The initial charge (with proper composition) is melted using the induction coils 18. The furnace 12 is moved into position beneath the upcaster 26 and raised by the elevator 14 to immerse the upcaster 26 into the metal. The upcaster 26 displaces a significant quantity of metal when it enters the furnace 12. Additional power is required to offset the chilling effect of the cooler upcaster 26 even though it is heated.

It will be appreciated that the amount of metal initially contained in the furnace 12 will not sustain melting for a very long period of time. This condition is overcome by providing a continuous molten metal feed. FIG. 1 shows the plasma torch 44 being used as a heat source for continuous melting but those skilled in the art may envision other melting techniques. A major feature of this melting operation is to supply molten metal to the furnace 12 at the same rate that the upcaster 26 is removing metal from the furnace 12 during the casting operation. If the melt rate exceeds the casting rate, the furnace 12 will become full and ultimately overflow. Conversely, if the melting rate is less than the casting rate, ultimately the upcaster 26 will exhaust the supply of metal and casting will cease.

Raising the furnace 12 after ceasing to provide additional molten metal from the external source provides a means to terminate the cast with a minimum amount of surplus metal remaining in the furnace 12 to be poured out as a butt or pig.

The load cells or weighing scales 40 and 42 beneath the ramp 34 allow operating personnel to control the melting rate. FIG. 1 shows an inclined surface 34 holding the melt stock 30 with a push rod 36 to shove the metal beneath the plasma torch 44. Other feeding mechanisms may be employed as well.

The melt stock 30 can be any type or assume any shape necessary to feed metal to the plasma torch 44. This type of melting is practical for feed stock varying from raw materials, large bulky scrap, prepared melt stock (which may be required if a second melting operation is necessary), fine scraps, turnings, or metal powders. Metal powders may also be injected directly into the plasma stream. Alloying may be conducted within the plasma stream.

Plasma heating is an ideal method inasmuch as the torch 44 provides the instantaneous high temperatures required for melting. In addition, the power settings on the torch 44 can be easily varied to modulate the melting rate. As a bonus, the ionized gas used to create the plasma has the additional benefit of potentially providing a protective atmosphere over the molten metal bath 46 to impede surface oxidation. Although not shown in FIG. 1, it also may be necessary to utilize a furnace cover to contain the protective atmosphere. If argon is used as the plasma gas, a means must be provided to remove this heavy gas from the area to prevent asphyxiation of operating personnel. Particular care needs to be taken if the caster is in a pit or an enclosed area. An oxygen detector should be used to insure that a breathable environment is maintained.

In order to maintain and control the proper temperature of the bath, the thermocouples 20, 22, 24 are disposed about the furnace 12. The bath temperature must be closely controlled to insure proper chemistry and good castability. The output of the temperature sensors 20, 22 and 24 may be fed into a microprocessor 54. See FIG. 2. The microprocessor 54 regulates the operation of the furnace system 10.

Figure 2:
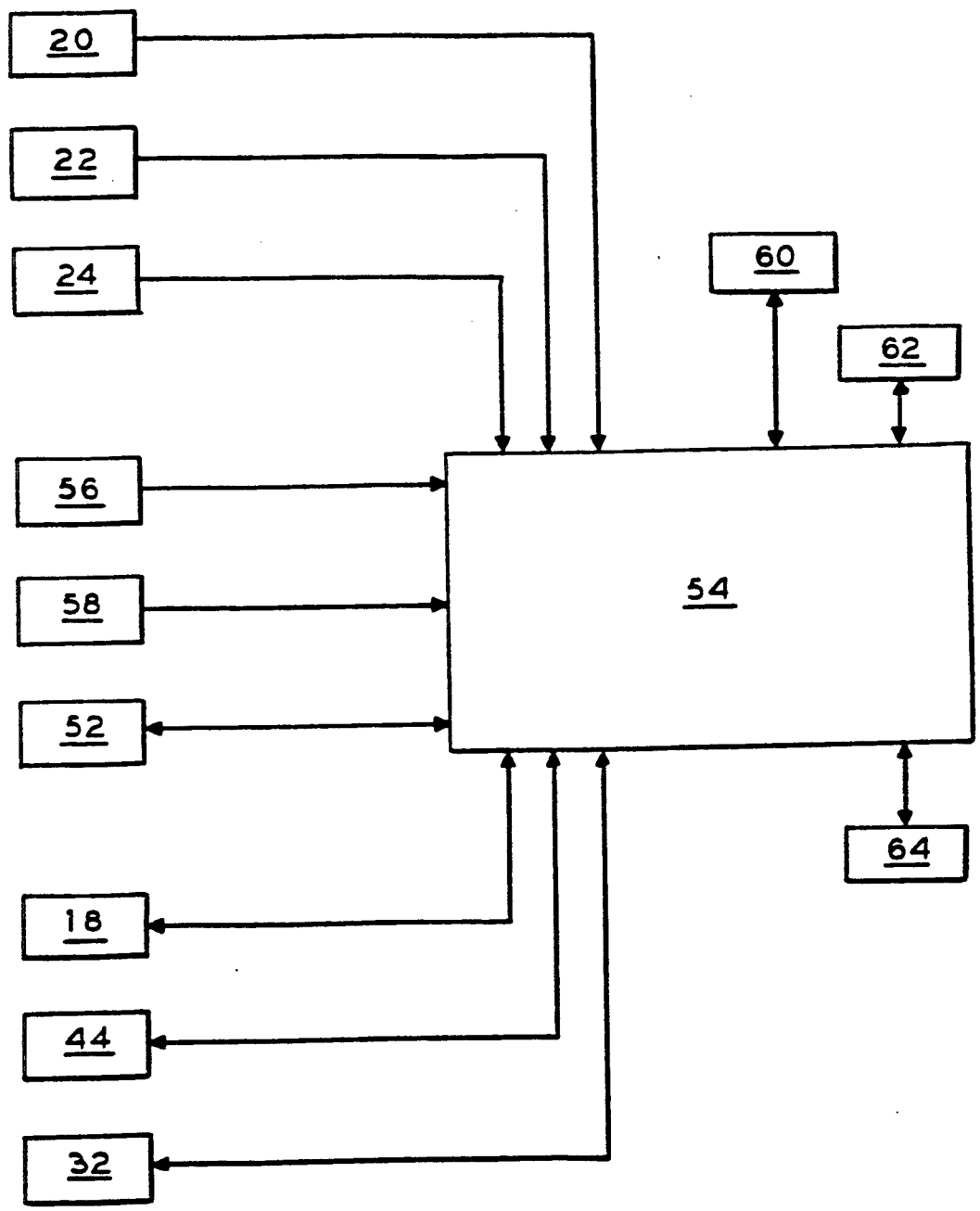
FIG. 2 is a schematic diagram of a control scheme for the invention.

FIG. 2 is an example of a control scheme for the furnace system 10. All of the input intelligence, i.e., melting rates, plasma torch temperature, stock feeding rate, bath temperature, upcaster stroke, etc., is fed into an analog/digital converter (not shown) affiliated with the microprocessor 54. The microprocessor 54 analyzes the measured conditions to insure the harmony of operation between the feeding mechanism 32 and the torch 44, the furnace 12 position, the upcaster 26 operation and the subsequent downstream operations.

The various temperature sensors 20, 22, 24, 56 and 58 measure the temperatures and constantly inform the microprocessor 54. These values and others may be displayed at the display/control 60. Based upon the needs at the time, the microprocessor 54 controls the frequency and stroke distance 52 of the upcaster 26, the operation of the plasma torch 44, and the feeding mechanism 32. Data may be entered into a recorder 62. Subsequent downstream processing 64 may also be handled by the microprocessor 54.

It was stated that an object of the instant invention is to deliver molten metal to a specific type of continuous caster but it should be explained that the invention described herein is uniquely suited to any continuous casting process. A salient feature is that the melting source, plasma as described herein, has the capability of providing molten metal at the same rate as it is demanded by the continuous caster for sustained operation. The instant invention also lends itself to a long time run (continuous operation). Alternatively, it is just as efficient for short term, semicontinuous, batch operations where the quantity of material (alloy) or size would be small. The system lends itself to quick and efficient alloy changes. When a decision is made to cease casting, the plasma melting is terminated, the caster consumes the molten metal in the furnace, the elevator lowers the furnace and any remaining metal is poured via the lip 16 into a pigging mold. It may be necessary to clean out the furnace 12 before starting the next alloy. This will depend on the compositional differences between the alloys. It is not anticipated that the high temperatures created by the plasma will degrade the alloy chemistry because the time exposure is short. Slight chemistry adjustments can be made in the furnace.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A unitary furnace system for continuous forming of a material, the system comprising a container suitable for holding molten material, means for heating the molten material in the container, a forming apparatus disposed within the container to be inserted into the molten material and to withdraw material from the container in a formed state, feeding means for directly introducing the material into the container, and means for melting the material just prior to its introduction into the container.

2. The furnace system according to claim 1 wherein the means for melting the material includes a plasma torch.

3. The furnace system according to claim 1 wherein the feeding means includes a material feed rate monitor.

4. The furnace system according to claim 1 wherein the feeding means includes a material pushing apparatus.

5. The furnace system according to claim 1 wherein the feeding means includes an inclined surface.

6. The furnace system according to claim 1 wherein the feeding means includes a melting rate detector.

7. The furnace system according to claim 1 wherein an upcaster is disposed within the container.

8. The furnace system according to claim 1 wherein the operations of the furnace components are coordinated so as to maintain an essentially constant level of material in the container during sustained operation of the system.

9. The furnace system according to claim 1, further comprising a central controller connected to the system, which controller receives intelligence from the various furnace components and monitors the operations thereof.

10. The furnace system of claim 1 wherein the container is affixed to an elevator for vertically moving the container in relation to the forming apparatus.

11. The furnace system according to claim 1 wherein the means for heating the material in the container includes induction heating coils.

* * * * *